United States Patent [19]

Van Gestel et al.

[11] Patent Number: 5,841,479

[45] Date of Patent: *Nov. 24, 1998

[54] TRANSFORM CODING AND DECODING OF AN EXTENDED DEFINITION VIDEO SIGNAL

[75] Inventors: Wilhelmus J. Van Gestel; Leendert T. Rozendaal, both of Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 588,801

[22] Filed: Jan. 19, 1996

[30] Foreign Application Priority Data

Jan. 20, 1995 [EP] European Pat. Off. .............. 95200144

[51] Int. Cl.$^6$ .................................................. H04N 7/015
[52] U.S. Cl. ........................................... 348/432; 348/426
[58] Field of Search ................................... 348/426, 427, 348/429, 432, 434; 386/123

[56] References Cited

U.S. PATENT DOCUMENTS 5,408,270   4/1995   Lim ........................................... 378/432

FOREIGN PATENT DOCUMENTS

0512626A2   11/1992   European Pat. Off. .

OTHER PUBLICATIONS

"Palplus System Specification", Jun. 1994, by Leo Rozendaal.

*Primary Examiner*—Victor R. Kostak
*Attorney, Agent, or Firm*—Michael E Belk

[57] ABSTRACT

Device for coding and decoding an extended definition video (EDTV) signal. The EDTV signal is composed of a first series of picture lines with a compatible video signal and at least one second series of picture lines with a helper signal. The device for adding extra picture lines includes apparatus to the first and/or second series of picture lines. The extra picture lines may include a constant luminance signal, the reference. signal of PALplus picture line 623, or a duplicate of the most adjacent picture line from the PALplus signal.

23 Claims, 6 Drawing Sheets

TRANSFORM CODING AND DECODING OF AN EXTENDED DEFINITION VIDEO SIGNAL

BACKGROUND OF THE INVENTION

The invention relates to a device and a method for coding and decoding an extended definition video signal, and to a video recorder provided with such a device. The invention also relates to a coded extended definition video signal and to a storage medium on which the coded video signal is stored.

European Patent Application EP-A 0 512 626 describes a device for recording and reproducing an extended definition video signal by means of a digital video recorder. The known recording device comprises transform coding means for coding an array of picture blocks each comprising N picture lines and M pixels in digital codewords.

The extended definition video signal is composed of a first series of picture lines with a compatible video signal and at least one second series of picture lines with a helper signal. An example is the PALplus television signal as described in "PALplus system specification", published in June 1994. PALplus is a transmission system with which a video signal having a 16:9 aspect ratio and an enhanced definition can be transmitted through existing PAL television transmitters while maintaining compatibility with conventional PAL receivers. An interlaced PALplus picture comprises 625 picture lines. These are consecutively 72 picture lines with the helper signal, 430 picture lines with the compatible picture signal (also referred to as letterbox signal) and again 72 picture lines with the helper signal. Moreover, picture line 23 comprises a series of widescreen signalling bits and picture line 623 comprises a reference signal. The other picture lines constitute the blanking interval in which the vertical flyback of the electron beam takes place and in which, if desired, teletext information may be accommodated. Conventional PAL receivers display the video signal in a letterbox format. This means that the 430 picture lines with the letterbox signal are displayed as such, while the helper signal becomes manifest as dark bars at the upper side and the lower side of the picture. In PALplus receivers with a 16:9 display screen, the helper signal is used to fill up the screen (576 lines).

There is a wish to transmit the extended definition video signal via a digital transmission medium designed for conventional PAL signals. More particularly, there is a wish to record a PALplus signal and reproduce it by means of a digital video recorder adapted for PAL signals. The known digital PAL video recorder is adapted to record 576 active picture lines of the PAL signal. To this end, the picture area is divided into picture blocks of 8*8 pixels each, so that 72 rows of picture blocks are formed. Each picture block is subjected to discrete cosine transform (DCT). As is assumed to be generally known, said transform of a picture block results in a data block of 8*8 coefficients. It is these coefficients which must be quantized, coded and recorded it. It has been found that said DCT coding leads to perturbation of the reproduced PALplus picture.

SUMMARY OF THE INVENTION

It is an object of the invention to mitigate the above-mentioned drawbacks.

To this end, the device according to the invention is characterized in that the device is provided with means for adding extra picture lines to the first and/or second series of picture lines of the extended definition video signal in order to bring the number of picture lines in the series to an integral multiple of N.

Figure 1:
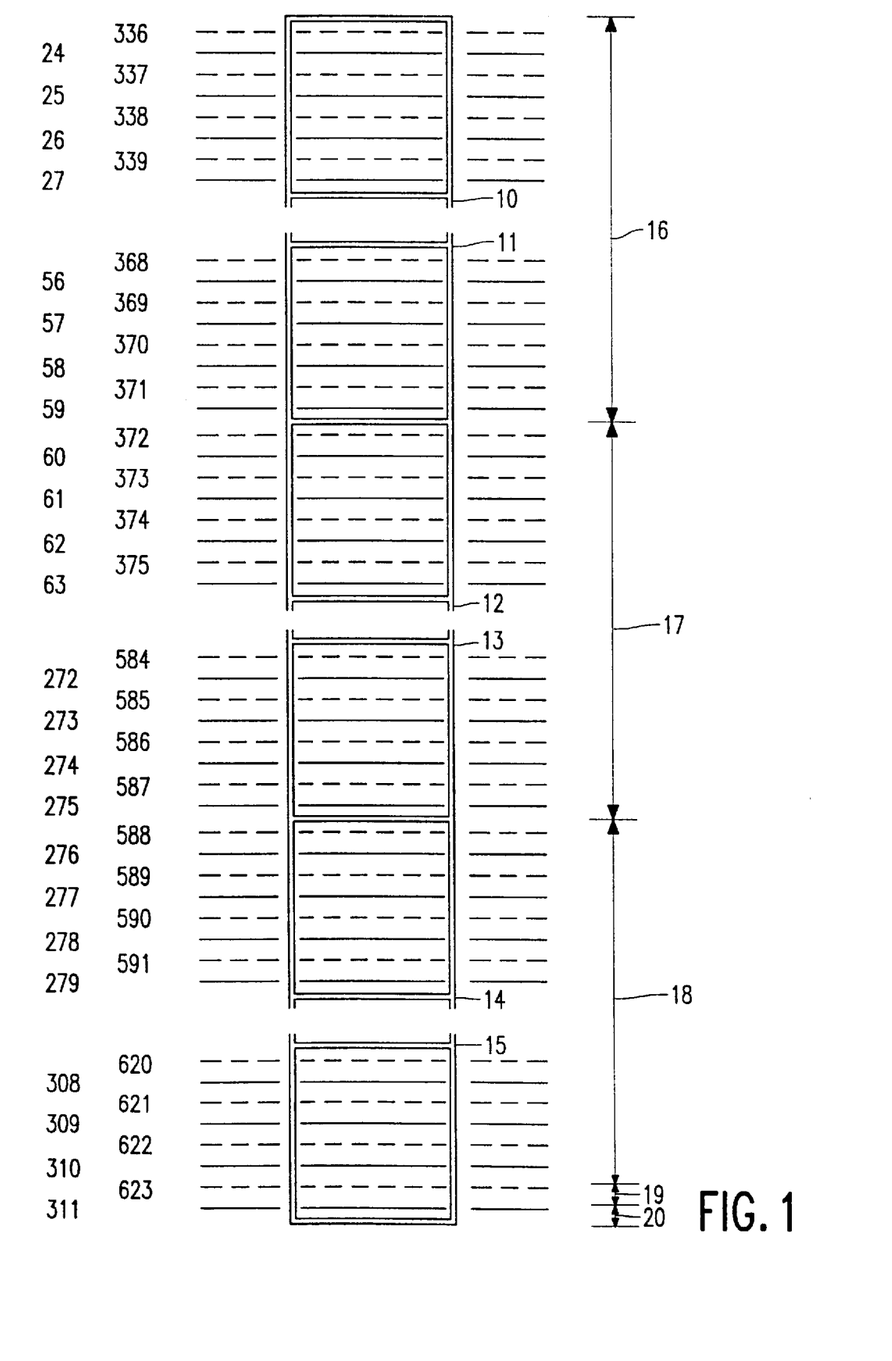
FIG. 1, already described, shows a picture line diagram to illustrate the problem occurring in the prior-art device.

The invention is based on the following recognition. Generally, the pixels within a DCT picture block are correlated in such a way that only a limited number of coefficients needs to be transmitted. If a PALplus video signal is applied to a digital PAL video recorder, at least one row of picture blocks comprises picture lines of the first series as well as picture lines of the second series. To illustrate this, FIG. 1 shows a possible location, in the vertical direction, of picture blocks 10–15 with respect to the picture lines of the PALplus video signal. In the Figure, the reference numeral 16 denotes the location of the first series of 72 picture lines with the helper signal, the reference numeral 17 denotes the location of the 430 picture lines with the letterbox signal, the reference numeral 18 denotes the location of the second series of 72 picture lines with the helper signal, the reference numeral 19 denotes the location of picture line 623 with the reference signal, and the reference numeral 20 denotes a blanking line.

The figure shows that picture block 13 comprises picture lines with the letterbox signal as well as picture lines with the helper signal. Picture block 15 not only comprises picture lines with the helper signal but also picture line 623 with the reference signal. It can easily be deduced from FIG. 1 that, in the case of a possible vertical offset of the rows of picture blocks, said property occurs in other rows of picture blocks.

The presence of two different types of (uncorrelated) signals within one picture block is unfavourable. This does not only have a detrimental effect on the efficiency of the discrete cosine transform, but visible artefacts also occur upon display of the reconstructed PALplus signal. Due to the absence of correlation in, for example picture block 13, more significant coefficients than usual are produced. They may be quantized in an insufficiently accurate way and then lead to inaccurate reproduction of the helper signal in the picture lines 275 and 587. These picture lines are representative of the picture contents in the (vertical) centre of the picture. Artefacts in this centre are extremely troublesome.

Using the measures according to the invention, it is now avoided that the helper signal and the letterbox signal occur simultaneously within one DCT picture block. Consequently, said artefacts will be completely absent.

A video signal of constant luminance may be accommodated in the extra picture lines. There is then a relatively small effect on the efficiency of the discrete cosine transform. An embodiment in which the extra picture lines are formed by repeating adjacent picture lines of the extended definition signal is very useful. This leads to a maximum correlation between picture lines within a picture block and thus to a minimal increase of the number of coefficients. The PALplus reference signal may also be accommodated in one of the extra picture lines. For the transmission of this signal (which is accommodated in picture line 623 and defines two distinct luminance levels) no special provisions are required, while it hardly influences the transform to a negative extent.

The corresponding device for decoding the extended definition video signal comprises transform decoding means for decoding the transmitted picture blocks. In conformity with the invention, the device is provided with means for removing at least one predetermined picture line from a row of decoded picture blocks and for contiguously reproducing the picture lines of the first and second series.

In a further embodiment the device is also provided with a memory for storing a predetermined picture line for display outside the first and second series of picture lines. In this embodiment, the signal accommodated in the extra picture lines, more particularly the PALplus reference signal, can be reproduced.

DETAILED DESCRIPTION OF THE PREFERRED EMBODIMENTS

Figure 2:
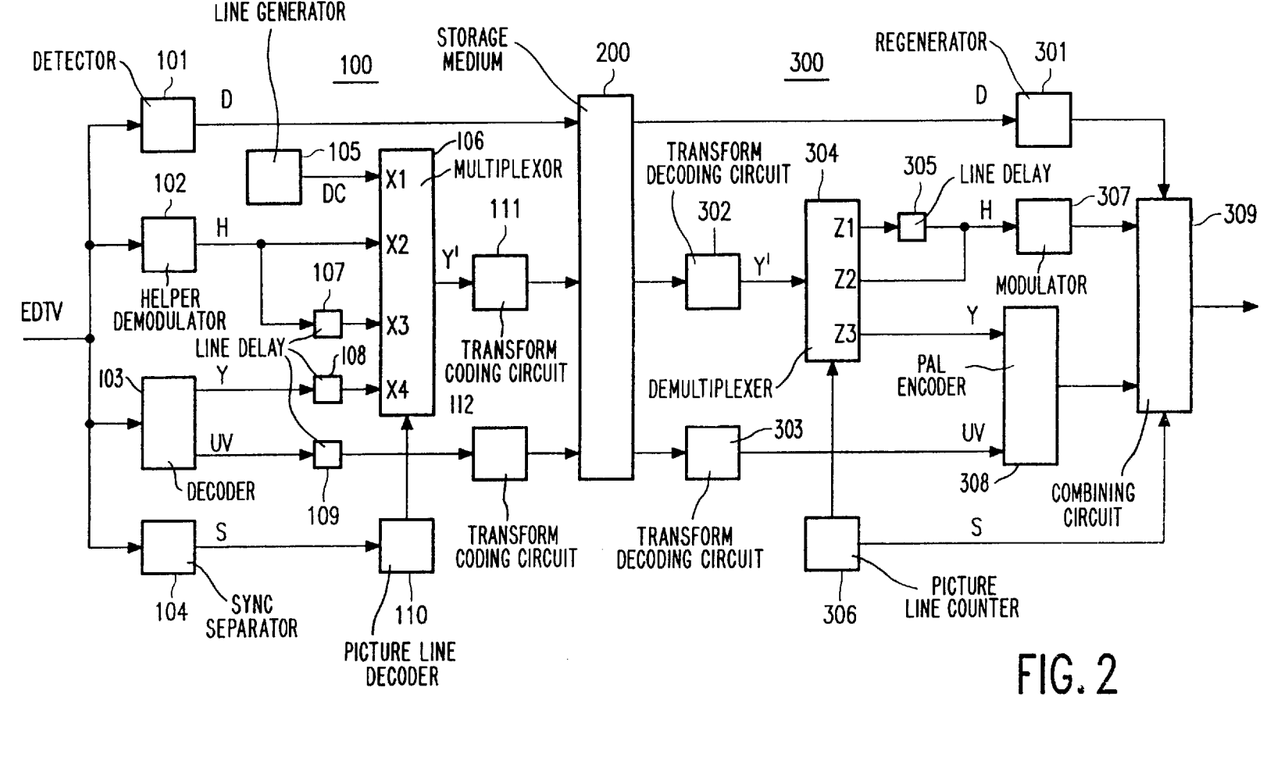
FIG. 2 shows an embodiment of a device according to the invention, comprising a video recorder for recording and reproducing an extended video signal.

A video recorder for recording and reproducing an extended video signal. in accordance with the PALplus specification is shown in FIG. 2 as an embodiment of a device according to the invention. The video recorder comprises a device 100 for coding an extended definition video signal (hereinafter referred to as recording device), a storage medium 200 and a device 300 for decoding an extended definition video signal (hereinafter referred to as playback device).

The recording device 100 will be described first. This device receives a PALplus television signal EDTV as specified in FIG. E6 of the previously mentioned "PALplus System Specification". However, the invention is not limited to coding of PALplus signals. Also extended definition signals based on, for example NTSC can be coded by means of the device.

The PALplus signal is applied to a detector 101, a helper demodulator 102, a PAL decoder 103 and a sync separator 104. Detector 101 is adapted to decode the widescreen signalling bits in picture line 23. Moreover, the detector is adapted to measure the black-and-white level of the reference signal in picture line 623 (see FIG. E4 of the PALplus specification). The output of the decoder supplies data packets D by means of which the signalling bits and the reference signal can be reproduced. Helper demodulator 102 demodulates the helper signal in the picture lines 24–59 and 275–310 of the even frame and the picture lines 336–371 and 587–622 of the odd frame of the PALplus signal. The output signal is a baseband helper signal H. PAL decoder 103 splits the letterbox signal in further known manner into a luminance signal Y and two colour difference signals UV. Sync separator 104 provides for the generation of line and field pulses. The helper signal H, the luminance signal Y and the colour difference signals are supposed to be available in the form of digital samples. AD converters used for this purpose are not shown in the figure.

The recording device further comprises a line generator 105 and a multiplexer 106. The line generator generates a luminance signal DC of constant luminance (for example, black) and applies it to a first input X1 of the multiplexer. The demodulated helper signal H is directly applied to a second input X2 of the multiplexer. The same helper signal H is applied to a third input X3 via a line delay element 107.

A fourth input X4 of then multiplexer receives the luminance signal Y via a line delay element 108. The colour difference signals UV are also delayed by one line by means of a delay element 109. The multiplexer 106 is controlled by a picture line decoder 110 which receives line and field pulses from sync separator 104. The control of the multiplexer will be further explained below.

The multiplexer output signal will hereinafter be referred to as pseudo-luminance signal Y'. It is applied to a first transform coding circuit 1 11. The delayed colour difference signals UV are applied to a second transform coding circuit 112. Both coding circuits have a conventional structure and comprise block-formation means (not shown) for forming an array of 8*8 picture blocks of consecutive picture lines of a frame (two fields), a discrete cosine transformer for transforming each picture block into coefficients, and an encoder for coding the coefficients in digital codewords. It will hereinafter be assumed that the array of picture blocks is formed during the picture lines 24–311 and 336–623 of the PALplus signal. The colour difference signals applied to the second coding circuit 112 are assumed to be sub-sampled. This means that one picture block of 8*8 samples of the colour difference signals UV corresponds to 2*2 picture blocks of 8*8 samples each of the pseudo-luminance signal Y'. The data packets D, the transform-coded pseudo-luminance signal Y' and the transform-coded colour difference signals UV are stored in the storage medium 200.

Figure 3:
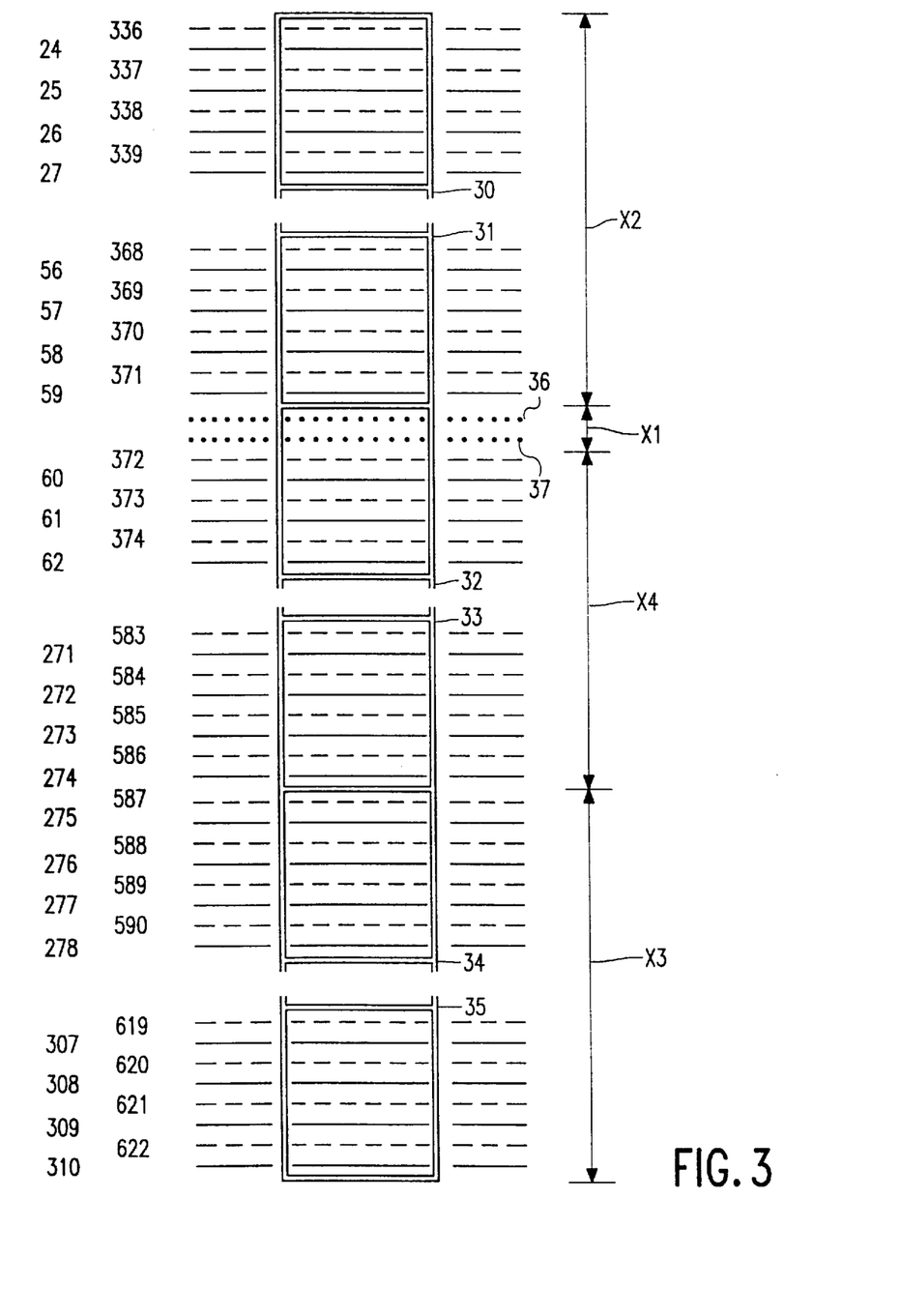
FIG. 3 shows a picture line diagram to explain a recording device shown in FIG. 2.

The operation of the recording device shown in FIG. 2 will now be explained with reference to a diagram shown in FIG. 3. This Figure shows:

the picture lines which are applied to the transform coding circuit 111 (see FIG. 2) and their corresponding PALplus picture line numbers, the vertical location of the picture blocks with respect to the picture lines, and the position (X1–X4) of the multiplexer 106 (see FIG. 2).

During the picture lines 24–59 and 336–371 of the picture line decoder 110 (see FIG. 2) the PALplus helper signal present at the multiplexer input X2 is directly applied to the transform coding circuit. Of these 72 picture lines, the transform coding circuit forms 9 rows of picture blocks, the first of which is denoted by the reference numeral 30 and the last of which is denoted by the reference numeral 31 in the Figure.

Subsequently, the input X1 is selected during one picture line per frame. In this way, the transform coding circuit receives two picture lines of constant luminance per picture from the line generator 105 (see FIG. 2). These picture lines are shown in broken lines in the Figure and denoted by the reference numerals 36 and 37. Subsequently, the input X4 is selected during the picture lines 61–275 and 373–587 of the picture line decoder. The line delay 108 (see FIG. 2) causes the transform coding circuit 111 to receive the PALplus luminance signal in this position in the picture lines 60–274 and 372–586. In this way, a total number of 432 picture lines per picture is applied to the transform coding circuit in the multiplexer positions X1 and X4. Of these 432 picture lines, the transform coding circuit forms 54 rows of picture blocks, the first of which is denoted by the reference numeral 32 and the last of which is denoted by the reference numeral 33 in the Figure. The associated colour difference signals are applied to transform coding circuit 112 via a corresponding line delay 109 (see FIG. 2). Of these signals, 27 rows of picture blocks are formed.

During the picture lines 276–311 and 588–623 of the picture line decoder, input X3 is selected. The line delay 107

(see FIG. 2) causes the coding circuit to receive the PALplus helper signal in picture lines 275–310 and 587–622 in this position. Of these 72 picture lines, the transform coding circuit forms 9 rows of picture blocks, the first of which is denoted by the reference numeral 34 and the last of which is denoted by the reference numeral 35 in the figure.

The figure shows that picture blocks comprising both the PALplus helper signal and the letterbox signal are absent. The discrete cosine transform of the helper signal, is thus not influenced by the letterbox signal, and conversely, so that artefacts will be completely absent upon reproduction of the PALplus signal.

The playback device 300 shown in FIG. 2 will now be described. This device receives the data packets D, the transform-coded pseudo-luminance signal Y' and the transform-coded colour difference signals UV from storage medium 200. They are applied to a regenerator 301, a first transform decoding circuit 302 and a second transform decoding circuit 303. The regenerator 301 reconstructs the picture lines 23 and 623 of the PALplus signal from the data packets D. The transform decoding circuits 302 and 303 have a conventional structure and comprise (not shown) a decoder for decoding the received codewords to obtain coefficients, an inverse discrete cosine transformer for retransforming the coefficients into 8*8 picture blocks, and a memory for storing the picture blocks in order that these can be read in an interlaced manner. As has been described in the foregoing, the transform decoding circuit 302 supplies a pseudo-luminance signal Y' which consecutively comprises: 72 picture lines with the helper signal, 432 picture lines with the luminance signal (with two picture lines having a constant luminance) and 72 picture lines with the helper signal. The pseudo-luminance signal Y' is applied to a demultiplexer 304 which is controlled by a picture line counter 306. This counter also generates a synchronizing signal S by means of which the picture line numbers referred to hereinafter are fixed.

During the 72 picture lines 23–58 and 335–370 of the picture line counter, the multiplexer applies the pseudo-luminance signal Y' to an output Z1. The helper signal at this output is applied to a modulator 307 via a line delay element 305, hence during the picture lines 24–59 and 336–371, which modulator modulates the helper signal on a suppressed subcarfier in conformity with the PALplus specification.

The demultiplexer is inactive during the 2 picture lines 59 and 336 of the picture line counter. The picture lines of constant luminance received in this period are thus removed from the recorded signal.

The multiplexer applies the pseudo-luminance signal Y' to output Z3 during the 430 picture lines 60–274 and 372–586 of the picture line counter. The luminance signal Y at this output is applied to a PAL encoder 308. During this period, the decoded colour difference signals UV are also received from transform decoding circuit 303 and are also applied to the PAL encoder.

The multiplexer applies the pseudo-luminance signal Y' to output Z2 during the 72 picture lines 275–310 and 587–622 of the picture line counter. The helper signal at this output is now applied directly, hence undelayed, to modulator 307 which modulates the helper signal in conformity with the PALplus specification.

The picture lines 23 and 623, the helper signal H and the letterbox signal YUV thus reproduced are combined to a PALplus signal in a combining circuit 309.

Figure 4:
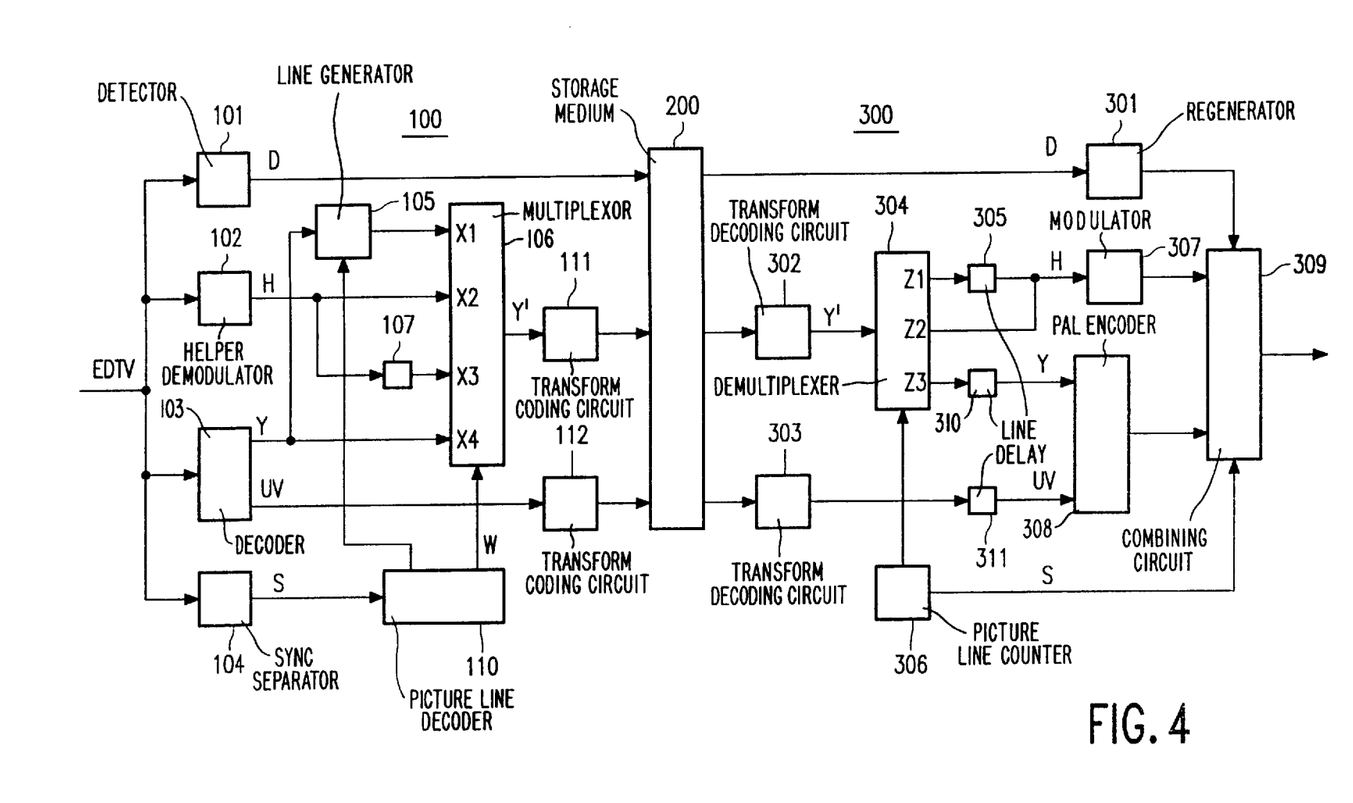
FIG. 4 shows a second embodiment of the device according to the invention.

FIG. 4 shows a second embodiment of the device according to the invention. In this figure, identical reference numerals denote the same components as in FIG. 2. The embodiment is distinguished from the previous one in that the extra picture lines are not added to the luminance signal before the picture lines but after the picture lines. This is achieved by omitting the line delay elements 108 and 109 shown in FIG. 2 in the recording device and by incorporating line delay elements 310 and 311 in the playback device.

Figure 5:
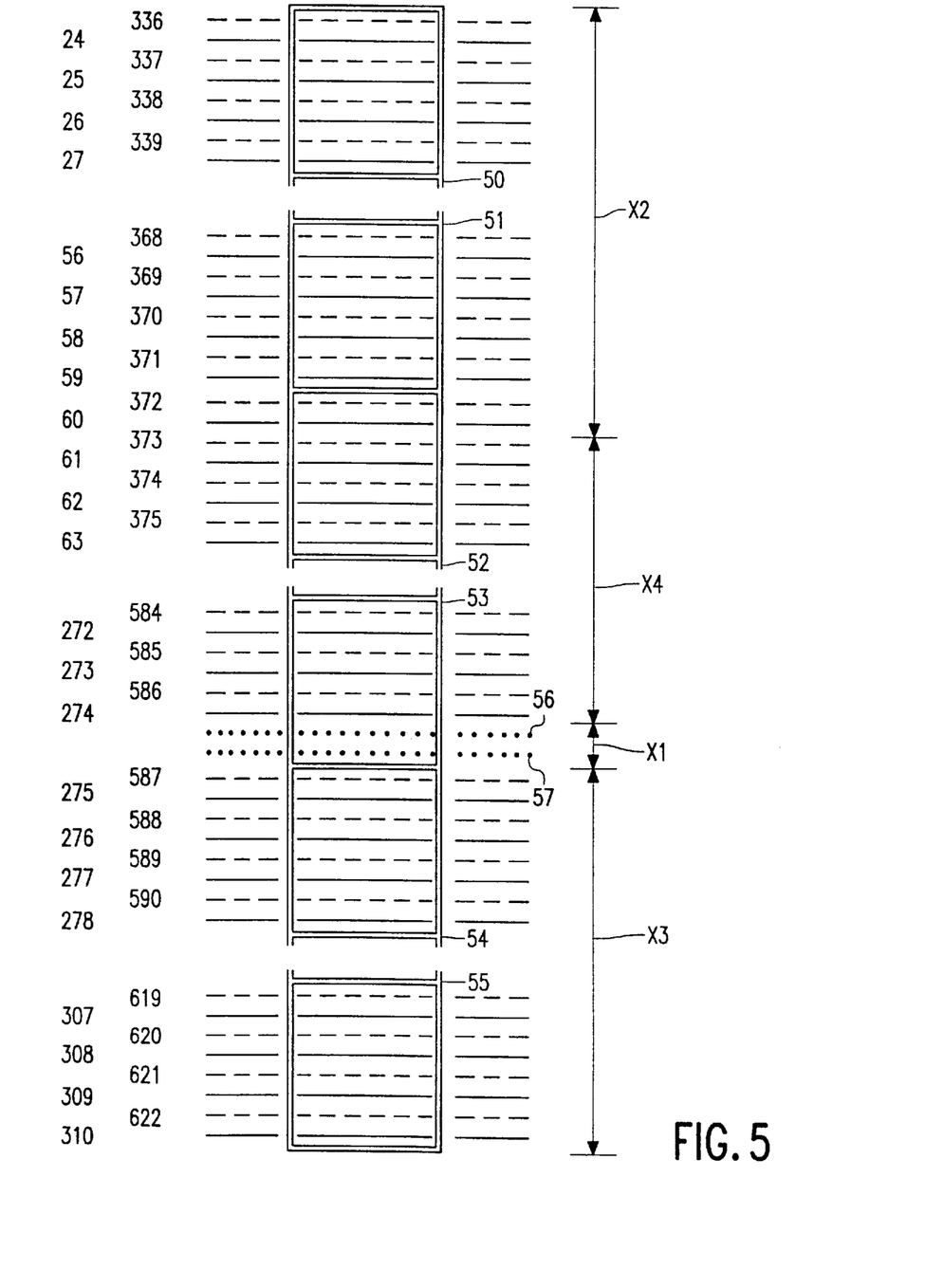
FIG. 5 shows a picture line diagram to explain a recording device shown in FIG. 4.

The operation of the embodiment shown in FIG. 4 will be explained with reference to a diagram shown in FIG. 5. This figure again shows:

the picture lines which are applied to the transform coding circuit 111 (see FIG. 4) and their corresponding PALplus picture line numbers, the vertical location of the picture blocks with respect to the picture lines, and the position (X1–X4) of the multiplexer 106 (see FIG. 4).

During the picture lines 24–59 and 336–371 the PALplus helper signal at multiplexer input X2 is directly applied to the transform coding circuit. Of these 72 picture lines, the transform coding circuit forms 9 rows of picture blocks, the first of which is denoted by the reference numeral 50 and the last of which is denoted by the reference numeral 51 in the figure.

Subsequently, the input X4 is selected during the picture lines 60–274 and 372–586. In this position, the transform coding circuit receives the 430 picture lines with the PALplus luminance signal Y. Subsequently, the input X1 is selected during one picture line per frame. In this position, the transform coding circuit receives per picture two picture lines from the line generator 105 (see FIG. 4). These picture lines are shown in broken lines in the figure and are denoted by the reference numerals 56 and 57. The transform coding circuit thus receives 432 picture lines in the positions X4 and X1 of the multiplexer. Of these lines, 54 rows of picture blocks are formed, the first of which is denoted by the reference numeral 52 and the last of which is denoted by the reference numeral 53 in the figure. The associated colour difference signals UV are applied to transform coding circuit 112. Of these signals, 27 rows of picture blocks are formed.

Input X3 is selected during the picture lines 276–311 and 374–623 of the picture line decoder. The line delay 107 (see FIG. 4) causes the coding circuit to receive the PALplus helper signal in picture lines 275–310 and 587–622 in this position. Of these 72 picture lines, the transform coding circuit forms 9 rows of picture blocks, the first of which is denoted by the reference numeral 54 and the last of which is denoted by the reference numeral 55 in the figure.

Again, the figure shows that picture blocks comprising both the PALplus helper signal and the letterbox signal are absent. The discrete cosine transform of the helper signal is therefore not influenced by the letterbox signal, and conversely, so that artefacts are completely absent upon reproduction of the PALplus signal.

The second embodiment has the advantage that the signal contents of the picture lines 274 and 586 of the luminance signal can be duplicated in the extra picture lines 56 and 57. To this end, the line generator 105 shown in FIG. 4 receives the luminance signal Y from PAL decoder 103. In this embodiment, the line generator comprises a line memory which duplicates the picture lines 274 and 586 in response to a write signal W from picture line decoder 110. The presence of duplicated picture lines in the relevant row of picture blocks (53 in FIG. 5) increases the efficiency of the transform coding to a considerable extent.

In the light of the foregoing, the operation of the playback device 300 shown in FIG. 4 may be sufficiently clear. It should only be noted that the demultiplexer 304 is now inactive during the picture lines 275 and 587 of the picture line counter. The duplicated picture lines 56 and 57 (see FIG. 5) are thereby removed from the reproduced PALplus signal.

Figure 6:
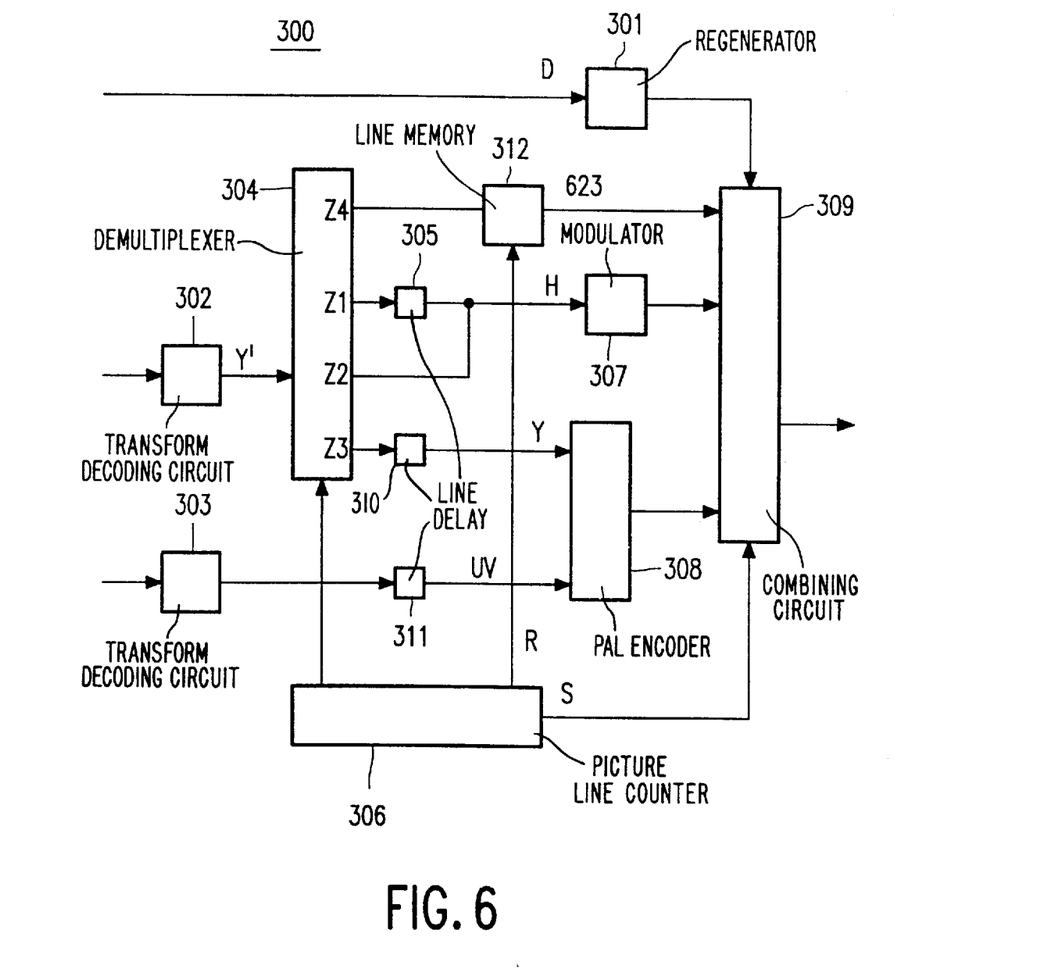
FIG. 6 shows a further embodiment of a device according to the invention.

It is to be noted that it is also possible and useful to accommodate the reference signal of picture lines 623 in the extra picture lines. The write signal W from picture line decoder 110 (see FIG. 4) is then active during picture line 623 of the PALplus signal. This option has the advantage that the detector 101 (see FIG. 4) is to generate a data packet D for the widescreen signalling bits only. The corresponding playback device is shown in FIG. 6. It is distinguished from the playback device 300 in FIG. 4 in that the demultiplexer 304 now has a fourth output Z4 via which the extra picture lines 56 and 57 (see FIG. 5) are stored in a line memory 312 during picture lines 275 and 587 of the picture line counter 306. The line memory receives a read signal R from the picture line counter during picture line 623 in order to read the stored reference signal.

Summarizing the foregoing, the invention relates to a device for coding (100) and decoding (300) an extended definition video (EDTV) signal. The EDTV signal is composed of a first series of picture lines with a compatible video signal (Y, UV) and at least one second series of picture lines with a helper signal PH). An example of such a signal is the PALplus signal which comprises 430 picture lines with a compatible PAL signal (1letterbox) and two bars of 72 picture lines with a helper signal. If these 574 picture lines are subjected to conventional transform coding, at least one row of 8*8 picture blocks comprises picture lines of the PAL signal and picture lines of the helper signal. This causes visible artefacts in the centre of a PALplus picture. In conformity with the invention, the device (100) comprises means (105–110) for adding extra picture lines (36, 37; 56, 57) to the first and/or second series of picture lines in order to bring the number of picture lines in each series to an integral multiple of 8. The extra picture lines may be constituted by a constant luminance signal (DC), the reference signal of PALplus picture line 623, or by a duplicate of the most proximate picture line from the PALplus signal.

What is claimed is:

1. A device for coding an extended definition video signal representing pictures having a first series of picture lines with a compatible video signal and at least one second contiguous series of picture lines with a helper signal, comprising:

transform coding means for coding each picture as an array of picture blocks of N picture lines and M pixels per line, and means for adding extra picture lines to at least one of the first and second series of picture lines of the extended definition video signal in order to bring the number of picture lines in the series to an integral multiple of N and to prevent picture blocks from including pixels of both the first and second series of picture lines.

2. A device as claimed in claim 1, whereas the extra picture lines are formed by repeating adjacent picture lines of the extended definition signal.

3. A device as claimed in claim 2, whereas the extended definition video signal is a PALplus television signal.

4. A device as claimed in claim 3, whereas the PALplus reference signal from picture line 623 is accommodated in at least one of the extra picture lines.

5. A device as claimed in claim 1, wherein the extended definition video signal is a PALplus television signal.

6. A device for decoding an extended definition video signal representing pictures having a first series of picture lines with a compatible video signal and at least one second contiguous series of picture lines with a helper signal, comprising:

means for receiving the signal in the form of an array of coded picture blocks of N picture lines and M pixels per line, at least one row of picture blocks including an extra picture line to bring the number of picture lines in at least one of the first or second series of picture lines to and integral multiple of N;

transform decoding means for decoding a picture blocks; and means for removing the extra picture line from the respective row of decoded picture blocks; and means for contiguously reproducing the picture lines of the first and second series.

7. A device as claimed in claim 6, wherein the device is further provided with a memory for storing the extra picture line for display outside the first and second series of picture lines.

8. A video recorder comprising:

means for coding an extended definition video signal having a first series of picture lines with a compatible video signal and at least one second series of picture lines with a helper signal, the coding device including transform coding means for coding an array of picture blocks of N picture lines and M pixels, and means for adding extra picture lines to at least one of the first and second series of picture lines of the extended definition video signal in order to bring the number of picture lines in the series to an integral multiple of N, and means for decoding an extended definition signal transmitted in the form of an array of coded picture blocks of N picture lines and M pixels, and including a first series of picture lines with a compatible video signal and at least one second series of picture lines with a helper signal, the decoding device including transform decoding means for decoding a picture block, and means for removing the added picture lines from a row of decoded picture blocks and for contiguously reproducing the picture lines of the first and second series.

9. An extended definition video signal comprising:

an array of coded picture blocks of N picture lines and M pixels, and including a first series of picture lines with a compatible video signals, at least a second series of picture lines with a helper signal, extra picture lines added to the first and/or second series of picture lines in order to bring the number of picture lines in the series to an integral multiple of N.

10. A storage medium on which an extended definition video signal as claimed in claim 9 is stored.

11. A method of coding an extended definition video signal including a first series of picture lines with a compatible video signal and at least one second series of picture lines with a helper signal, said method comprising the step of transform coding an array of picture blocks of N picture lines and M pixels in digital codewords, coding of picture blocks being preceded by a step of addition of extra picture lines in at least one of the first and second series in order to bring the number of picture lines in each series up to an integral multiple of N.

12. A method as claimed in claim 11, wherein the extra picture lines are formed by repeating adjacent picture lines of the extended definition signal.

13. A method as claimed in claim 12, wherein the extended definition video signal is a PALplus television signal.

14. A method as claimed in claim 13, wherein the PALplus reference signal from picture line 623 is accommodated in at least one of the extra picture lines.

15. A method as claimed in claim 11, wherein the extended definition video signal is a PALplus television signal.

16. A method of decoding an extended definition video signal from digital codewords, wherein the method comprises the steps of:

transforming the digital codewords in an array of picture blocks, including a first array of picture blocks with a first series of picture lines with a compatible video signal, and at least one second array of picture blocks with a second series of picture lines with a helper signal, and wherein the first or second series includes at least one extra picture line to bring the number of lines in the series up to an integral multiple of the number of lines in each picture block, removing the at least one extra picture line from a row of at least one of the first and second array of picture blocks, and contiguously reproducing the other picture lines of the first and second series.

17. A method as claimed in claim 16, further comprising a step of storing the extra line in a memory and displaying said picture line outside the first and second series of picture lines.

18. A device for coding a video signal, comprising:

transform coding means for coding an array of picture blocks of N picture lines and M pixels; and means for adding extra picture lines to at least one of a first series of picture lines with a compatible video signal and a second series of picture lines of an extended definition video signal in order to bring the number of picture lines in the series to an integral multiple of N; and wherein the extra picture lines represent a video signal having constant luminance.

19. A device as claimed in claim 18, wherein the extended definition video signal is a PALplus television signal.

20. A device for coding a video signal, comprising:

transform coding means for coding an array of picture blocks of N picture lines and M pixels; and means for adding extra picture lines to at least one of a first series of picture lines with a compatible video signal and a second series of picture lines of an extended definition video signal in order to bring the number of picture lines in the series to an integral multiple of N; and wherein:
the extended definition video signal is a PALplus signal; and
the PALplus reference signal from picture line 623 is accommodated in at least one of the extra picture lines.

21. A method of coding a video signal of, comprising the steps of:

adding extra picture lines in at least one of a first series of picture lines of a compatible video signal and second series of picture lines of a helper signal in order to bring the number of picture lines in each series to an integral multiple of N; and transform coding an array of picture blocks of N picture lines and M pixels in digital codewords; and wherein the extra picture lines represent a video signal having a constant luminance.

22. A method as claimed in claim 21, wherein the extended definition video signal is a PALplus television signal.

23. A method of coding a video signal, comprising the steps of:

adding extra picture lines in at least one of a first series of picture lines of a compatible video signal and second series of picture lines of a helper signal in order to bring the number of picture lines in each series to an integral multiple of N; and transform coding an array of picture blocks of N picture lines and M pixels in digital codewords; and wherein:
the extended definition video signal is a PALplus signal; and
the PALplus reference signal from picture line 623 is accommodated in at least one of the extra picture lines.

* * * * *